United States Patent
Sim (10) Patent No.: US 8,306,323 B2
(45) Date of Patent: Nov. 6, 2012

(54) METHOD AND APPARATUS FOR CORRECTING DEPTH IMAGE

(75) Inventor: Jae Young Sim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 694 days.

(21) Appl. No.: 12/458,672

(22) Filed: Jul. 20, 2009

(65) Prior Publication Data
US 2010/0142815 A1 Jun. 10, 2010

(30) Foreign Application Priority Data
Dec. 4, 2008 (KR) .................. 10-2008-0122440

(51) Int. Cl.
*G06K 9/00* (2006.01)
*G06T 15/40* (2011.01)
(52) U.S. Cl. .................. 382/167; 345/422
(58) Field of Classification Search .......... 382/162, 382/167, 274, 305, 312; 348/207.99, 208.13; 345/422, 589; 358/504, 518
See application file for complete search history.

(56) References Cited

U.S. PATENT DOCUMENTS

| | | | |
|---|---|---|---|
| 7,171,045 B1 * | 1/2007 | Hamilton | 382/166 |
| 7,672,028 B2 * | 3/2010 | Uroz et al. | 358/504 |
| 7,724,253 B1 * | 5/2010 | Cook et al. | 345/422 |
| 7,737,989 B2 * | 6/2010 | Pettitt et al. | 345/589 |
| 7,869,649 B2 * | 1/2011 | Watanabe et al. | 382/162 |
| 8,134,637 B2 * | 3/2012 | Rossbach et al. | 348/348 |
| 2005/0031166 A1 | 2/2005 | Fujimura et al. | |
| 2008/0170067 A1 | 7/2008 | Kim et al. | |
| 2008/0247670 A1 | 10/2008 | Tam et al. | |

FOREIGN PATENT DOCUMENTS

KR 10-2008-0102826 11/2008

OTHER PUBLICATIONS

Extended European Search Report, mailed Mar. 4, 2010, in corresponding European Application No. 09168225.5 (9 pp.).

\* cited by examiner

*Primary Examiner* — Kanjibhai Patel
(74) *Attorney, Agent, or Firm* — Staas & Halsey LLP (57) ABSTRACT

An apparatus and method for correcting a depth image of an object based on a table, the table being formed according to color identification information of a target color, and a first measurement error in which a difference between a ground truth depth value of a base color and a measured depth value of the target color is reflected.

16 Claims, 6 Drawing Sheets

<TABLE 300>

| TARGET COLOR | MEASUREMENT ERROR |
|---|---|
| COLOR IDENTIFICATION INFORMATION 1 | a |
| COLOR IDENTIFICATION INFORMATION 2 | b |
| COLOR IDENTIFICATION INFORMATION 3 | c |
|  |  |

301 points to the TARGET COLOR column; 302 points to the MEASUREMENT ERROR column.

FIG. 6

METHOD AND APPARATUS FOR CORRECTING DEPTH IMAGE

CROSS-REFERENCE TO RELATED APPLICATIONS

This application claims the benefit of Korean Patent Application No. 10-2008-0122440, filed on Dec. 4, 2008, in the Korean Intellectual Property Office, the disclosure of which is incorporated herein by reference.

BACKGROUND

1. Field

Example embodiments of the following description relate to a method and apparatus for correcting a depth image that may correct distortion of a depth image of a depth camera based on a difference between a measured depth value associated with a target color and a ground truth depth value associated with a base color, thereby generating an accurate depth image realistically corresponding to an object.

2. Description of the Related Art

Three-dimensional (3D) information may be utilized in various application fields. In general, the 3D information may include geometry information and color information. The color information may be obtained in a color image type using an image acquisition apparatus such as a Charged Coupled Device (CCD) camera, a Complementary Metal-Oxide-Semiconductor. (CMOS) camera, etc. The geometry information may be obtained in a depth image type. The depth image may be passively extracted from several color images using computer vision techniques, however, this may have a complex process, and it is difficult to provide accurate depth values of real world objects. A method of relatively easily and accurately acquiring the depth image is to capture an object using a depth camera. The depth image generated using the depth camera may provide a depth value for each pixel associated with the captured object.

However, the depth camera may measure a depth value based on a Time Of Flight (TOF), and thus a distortion of the measured depth value may occur due to characteristics of the object or a peripheral environment. Specifically, even though the objects with different colors are positioned at the same distance from the depth camera, measured depth values may be different among the objects due to the difference of corresponding colors.

SUMMARY

According to example embodiments, there may be provided a method for correcting a depth image of an object, the method including forming a table according to color identification information of a target color, and a first measurement error, the first measurement error being a difference between a ground truth depth value of a base color and a measured depth value of the target color, determining a region of the target color in the depth image, and correcting a depth value of the determined region based on the first measurement error.

According to example embodiments, there may be also provided an apparatus for correcting a depth image of an object, the apparatus including, a table storing unit to store a table formed according to color identification information of a target color, and a first measurement error, the first measurement error being a difference between a ground truth depth value of a base color and a measured depth value of the target color, a color identification unit to identify a region of the target color in the depth image, and a correction unit to correct a depth value of the identified region of the target color based on the first measurement error.

Example embodiments may provide an apparatus for correcting a depth image that may correct a depth distortion for each color of an object, thereby generating a depth image corresponding to actual depth characteristics of the object.

Example embodiments may also provide an apparatus of correcting a depth image that may correct a distortion having different magnitudes for different depth cameras, thereby generating a depth image corresponding to actual depth characteristics of an object.

Example embodiments may further provide an apparatus of correcting a depth image that may maintain a table for correction, thereby easily supplementing a correction function even in a depth camera that does not have the correction function.

Additional aspects and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
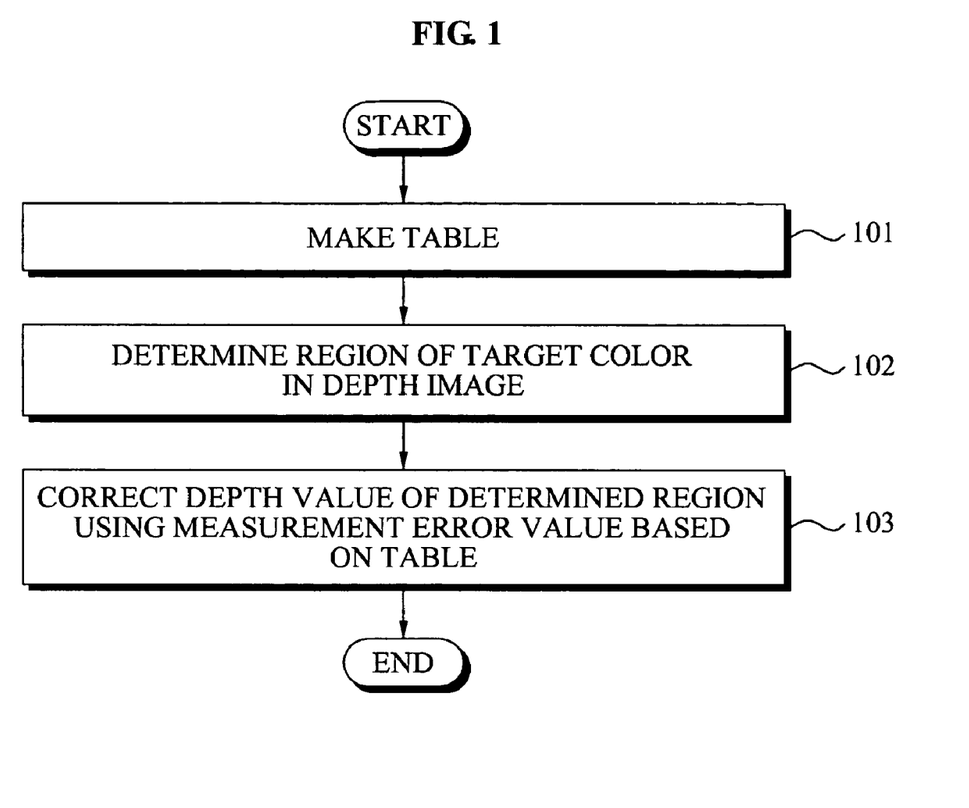
FIG. 1 illustrates a flowchart of a method for correcting a depth image according to example embodiments.

FIG. 1 illustrates a flowchart of a method for correcting a depth image in an apparatus for correcting the depth image according to example embodiments.

Referring to FIG. 1, in operation 101, the apparatus for correcting the depth image according to the present example embodiment may make a table formed according to color identification information of a target color and a measurement error corresponding to the color identification information The target color may designate all colors other than the base color.

Also, the target color may be understood as a color having a depth value different from that of the base color although being positioned at the same distance as that of the base color from a depth camera.

Specifically, the target color may be understood as a color whose actual depth value is distorted, and the base color may be understood as a color having an identical depth value to the actual depth value. The depth of the base color may be slightly distorted from the actual depth value, however, it is assumed that a distortion may not occur under an ideal environment.

The depth camera according to an example embodiment may be understood as any camera generating the depth image based on a Time Of Flight (TOF), which is a returning time of an irradiated light reflected on an object.

Preferably, the base color may be an achromatic color such as white, black, gray, etc. Also, the measurement error may be determined utilizing a difference between a depth value of the base color and a depth value of the target color.

Hereinafter, for convenience of description, it is understood that the measurement error and the difference between the depth value of the base color and the depth value of the target color are the same.

Figure 2:
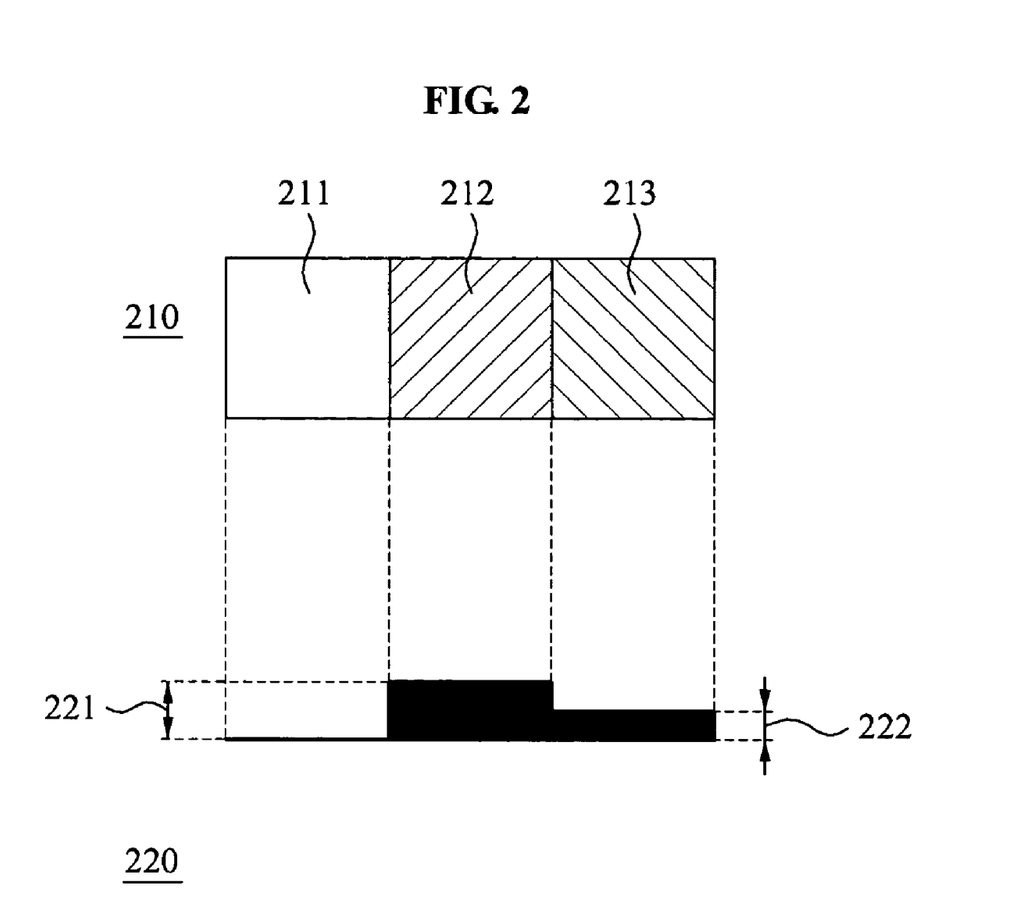
FIG. 2 illustrates a target color and a base color according to example embodiments.

FIG. 2 illustrates a target color and a base color according to example embodiments.

A depth image 210 generated by a depth camera according to an example embodiment includes a base color 211, a first target color 212, and a second target color 213. When it is assumed that the base color 211, the first target color 212, and the second target color 213 are captured at an identical distance from the depth camera, different depth values may be measured although an identical depth value should be actually measured.

A side view 220 may be obtained when the depth image 210 is viewed in three dimensions (3D). Referring to the side view 220, although the depth image 210 is captured at an identical distance from the depth camera, different geometric shapes may be obtained. Specifically, as compared to the base color 211, the first target color 212 may be displayed as a protuberant shape by a measurement error 221, and the second target color 213 may be displayed as a protuberant shape by a measurement error 222.

That is, a depth value of the first target color 212 may be erroneously measured as being shallower than an actual depth value by the measurement error 221, and a depth value of the second target color 213 may be erroneously measured as being shallower than an actual value by the measurement error 222.

In this instance, the apparatus of correcting the depth image according to the present example embodiment may record into a table measurement errors measured for each target color in operation 101 (FIG. 1).

The table will be described in detail with reference to FIG. 3.

Figure 3:
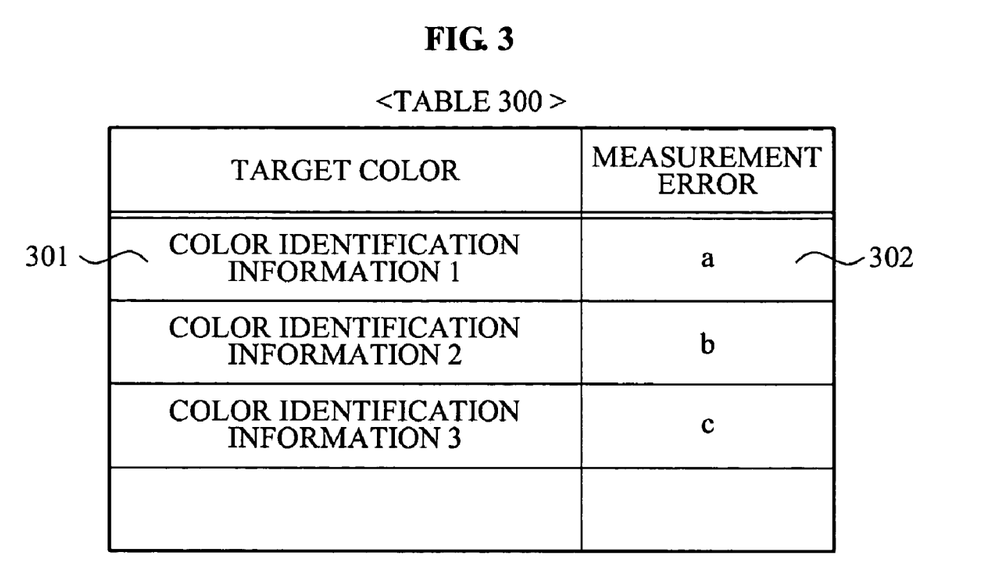
FIG. 3 illustrates a table formed according to color identification information of a target color and a measurement error corresponding to the color identification information, according to example embodiments.

FIG. 3 illustrates a table formed according to color identification information of a target color and a measurement error corresponding to the color identification information, according to example embodiments.

The table 300 includes a first field where color identification information of a target color is stored, and a second field where a measurement error is stored to correspond to the first field.

For example, color identification information (1) 301 of the target color may be stored in the first field, and "a" 302 of the measurement error may be stored in the second field.

The color identification information (1) 301 may identify an inherent color, and it is possible for any type of data capable of being stored in an electromagnetic recording medium to be identified. Also, the measurement error "a" 302 is a difference between a depth value of the base color and a depth value of the target color.

Specifically, the table 300 may store calculated measurement errors of the target colors having wavelengths in a visible bandwidth, with respect to the base color.

According to an example embodiment, the table 300 may be stored in a memory of the depth camera, thereby easily supplementing a correction function, and even being utilized in a depth camera without the correction function.

Referring again to FIG. 1, in operation 102, the apparatus of correcting the depth image may determine a region of the target color in the generated depth image.

Specifically, the apparatus may identify colors expressed by pixels of the depth image, and identify the region in the depth image corresponding to the target color.

Next, in operation 103, the apparatus may identify a measurement error corresponding to the target color based on the table, and correct the depth values of the region in the depth image corresponding to the target color.

The apparatus according to an example embodiment may correct the depth image using a second measurement error other than the measurement error.

For example, the measurement error is a numerical value calculated based on characteristics of a color of an object, however, the second measurement error may be calculated based on at least one of distance information, material information, temperature information, moisture information, brightness information, and saturation information of the object. Thus, the apparatus may correct distortion of the depth image using the calculated second measurement error in operation 103 or a new operation after operation 103. Additionally, the distance information may be understood as a distance between the object and the depth camera.

The apparatus according to an example embodiment may correct a depth value of the region in a depth image corresponding to a target color, while changing the target color, and therefore may consequently correct the distorted depth image.

Consequently, according to an example embodiment, the apparatus may correct a depth distortion due to a color of the object, thereby generating a depth image corresponding to actual depth characteristics of the object. In addition, according to an example embodiment, the apparatus may conveniently and rapidly correct different distortion characteristics for each depth camera type, thereby generating the depth image corresponding to the actual depth characteristics of the object.

Figure 4:
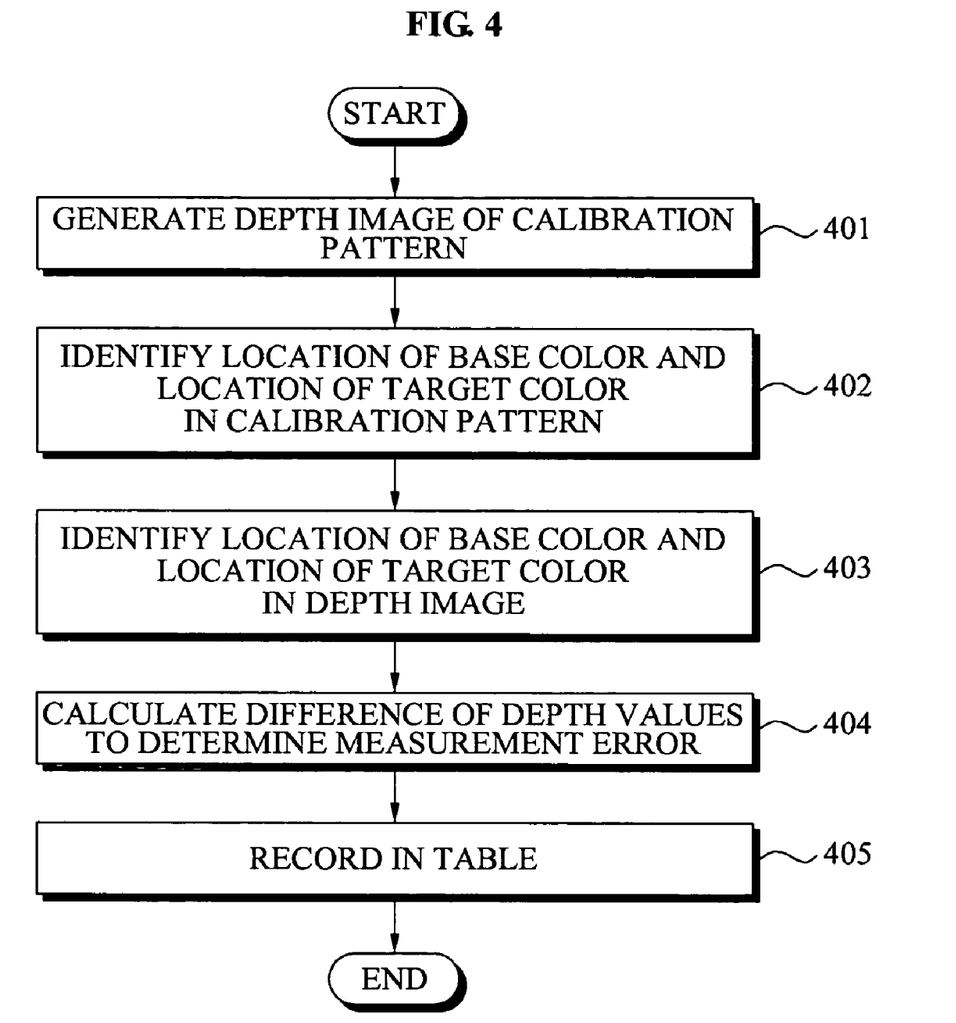
FIG. 4 illustrates a flowchart of a method of determining a measurement error using a calibration pattern, according to example embodiments.

FIG. 4 illustrates a flowchart of a method of determining a measurement error using a calibration pattern, according to example embodiments.

The apparatus of correcting the depth image according to an example embodiment may calculate measurement errors for target colors using a calibration pattern having at least two colors on a plane. Also, the calculated measurement errors may be associated with the target color to generate or update the table.

Specifically, in operation 401, the apparatus may generate a depth image using the calibration pattern. For example, the apparatus may control the depth camera to capture the calibration pattern, thereby generating the depth image.

The calibration pattern may be used to find measurement errors of depth values between the base color and a target color in a specific depth camera, and may have at least two colors on the plane. In this instance, any one color of the calibration pattern may be designated as the base color, and remaining colors may be designated as the target colors.

Next, the apparatus may identify the location of the base color and the location of the target color in the calibration pattern in operation 402, and calculate the location of the base color and the location of the target color in the depth image based on the identified locations in operation 403. Specifically, the apparatus may identify pixels of the base color and pixels of the target color, in a captured depth image based on the calibration pattern.

In operation 404, the apparatus may calculate a difference between the depth value of the calculated location of the base color and the depth value of the identified location of the target color, and determine the calculated difference as the measurement error for the target color. Since a depth value for each pixel may be obtained from the depth image, the apparatus may calculate the identified depth values of the pixels to calculate a difference of the calculated identified depth values.

In operation 405, the apparatus may associate color identification information of the target color with the determined measurement error to record the associated measurement error in the table. Thus, the apparatus may capture the depth image of the calibration pattern to generate a table or update the existing table.

The apparatus according to an example embodiment may generate a table for each of various distances between the depth camera and the calibration pattern.

In addition, the apparatus may further record type information of the depth camera, peripheral environment information of the object, and calibration pattern information in the table.

Figure 5:
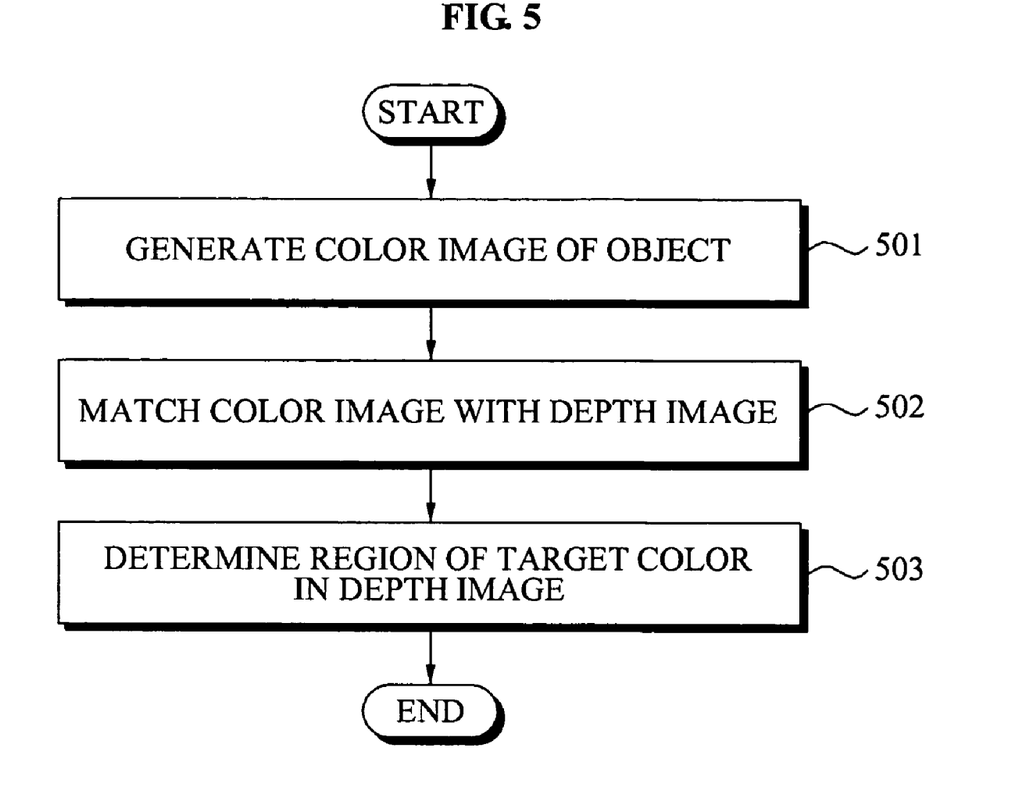
FIG. 5 illustrates a flowchart of a method of determining a region of target color in a depth image, according to example embodiments.

FIG. 5 illustrates a flowchart of a method of determining a region of target color in a depth image, according to example embodiments.

In operation 501, the apparatus of correcting the depth image may generate a color image of the object using a color camera to determine a region of the target color in a depth image of the object. The color camera may be at least one of a complementary metal-oxide semiconductor (CMOS) camera and a charge-coupled device (CCD) camera.

In operation 502, the apparatus may match the generated color image with the depth image generated by the depth camera.

In operation 503, the apparatus may identify a location of the target color in the generated color image, and determine a region of the target color in the depth image based on the identified location of the target color.

For example, the depth camera and the color camera may capture the object while cooperating with each other, thereby respectively generating the depth image and the color image. Thus, the apparatus may calculate a location of the target color in the generated color image, and calculate conversion information between the depth camera and the color camera using a camera calibration scheme, etc.

The conversion information may be understood as a location relationship between the depth camera and the color camera. For example, the conversion information may be the intrinsic and extrinsic parameters of the color camera and the depth camera.

When the conversion information is calculated, the apparatus may apply the calculated conversion information in the calculated location of the target color to identify pixels of the target color in the depth image.

Figure 6:
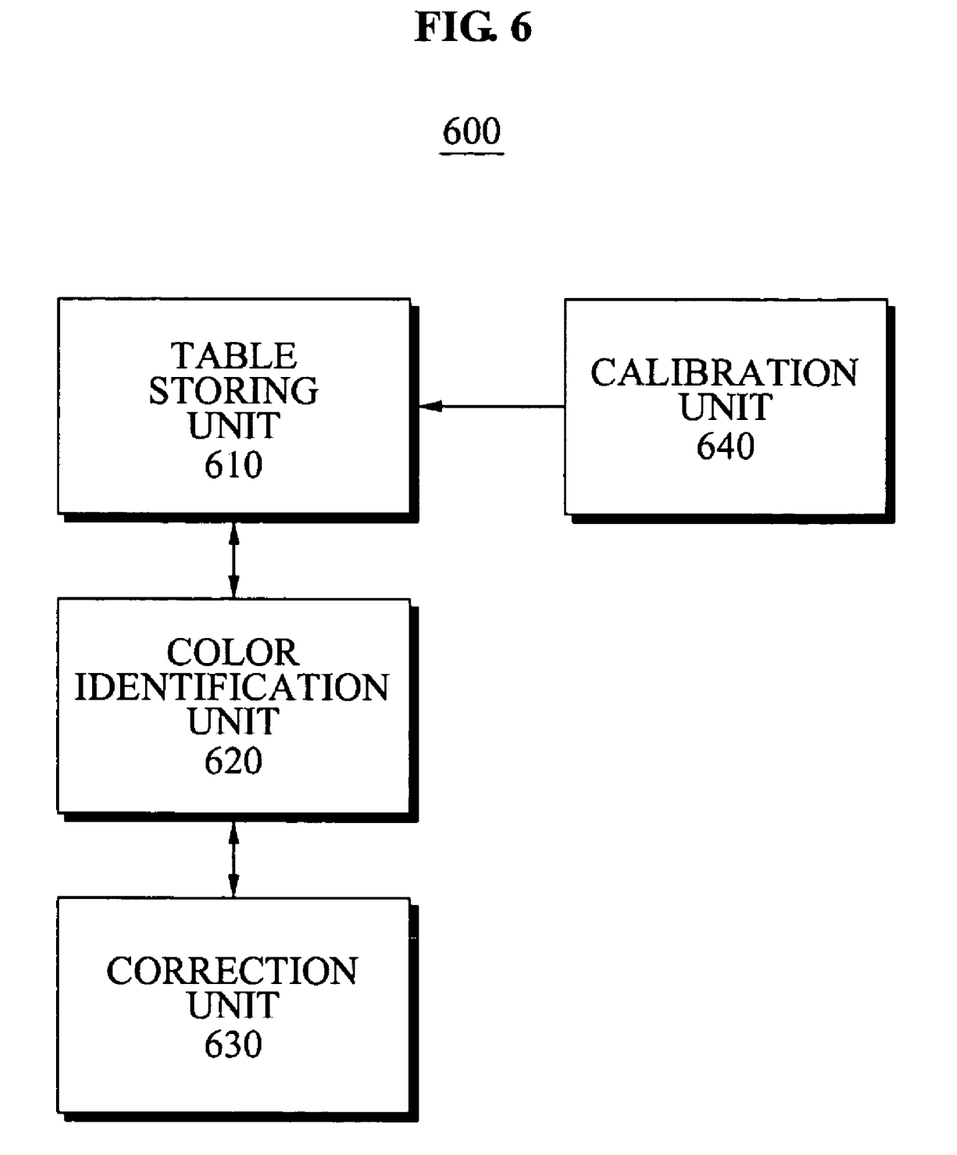
FIG. 6 illustrates a block diagram of an apparatus for correcting a depth image according to example embodiments.

FIG. 6 illustrates a block diagram of an apparatus 600 for correcting a depth image according to example embodiments.

As illustrated in FIG. 6, the apparatus 600 according to an example embodiment includes a table storing unit 610, a target color identification unit 620, and a correction unit 630.

The table storing unit 610 may store a table formed according to color identification information of a target color, and a measurement error in which a difference between the depth value of the base color and the depth value of the target color is reflected. For this purpose, the table storing unit 610 may be included in a storing medium of the depth camera, and may backup the table to a predetermined web server or another storing medium or update an existing table to a new table.

As another example, the table storing unit 610 may be included in a Read Only Memory (ROM) of the depth camera. In this case, the table may be a program implemented using a predetermined algorithm. That is, when the depth camera captures the object to generate the depth image, the table recorded in the ROM may cooperate with a peripheral Random Access Memory (RAM) or cache memory to correct the depth image using the algorithm.

Next, the target color identification unit 620 may verify a region of the target color in the depth image of the object. Specifically, the target color identification unit 620 may identify a. location of the target color in the color image of the object generated using the color camera, and calculate a location of a region of the target color in the depth image based on the identified location of the target color.

For this purpose, the target color identification unit 620 may identify the region of the target color in the depth image based on the color image.

As an example, when the depth image and the color image are captured as a single module, that is, when the depth camera is able to generate the color image, the target color identification unit 620 may automatically identify, within a camera module, which color of the object a specific pixel of the depth image corresponds to.

As another example, when the depth image and the color image are respectively captured as independent modules, the target color identification unit 620 may match the generated depth image with the generated color image to identify which color of the object the specific pixel of the depth image corresponds to.

Specifically, which depth value, of the depth image specific pixels by which the color is generated, can be identified. More specifically, the target color identification unit 620 may identify the location of the target color in the color image of the object generated using the color camera, and calculate the region of the target color in the depth image based on the identified location of the target color.

As an example used to match the depth image and the color image, the color image and the depth image may be matched with each other based on a location relationship between the depth camera and the color camera.

Specifically, the target color identification unit 620 may identify the location of the target color in the color image of the object generated using the color camera. Also, the target color identification unit 620 may calculate conversion information mutually separated from among the location relationship between the depth camera and the color camera. In this instance, the conversion information may be calculated as a vector, including information about a separated direction, and intrinsic and extrinsic parameters of the color camera and the depth. camera. Next, the target color identification unit 620 may apply the calculated conversion information in the calculated location of the target color to determine the region displayed as the target color in the depth image. When the color camera and the depth camera are not separated from the object at an identical distance, a separated distance between the color camera and the depth camera may be reflected in the calculated conversion information, whereby the conversion information may be calculated in a 3D vector type.

Next, the correction unit 630 may correct a depth value of the identified region using the measurement error based on the table. For example, to correct the depth value of the target color, the correction unit 630 may add the measurement error to the depth value of the identified region.

The apparatus 600 according to an example embodiment further includes a calibration unit 640.

The calibration unit 640 may calculate a difference between the depth value of a location of the base color and the depth value of the target color. Thus, the table storing unit 610 may determine the calculated difference as the first measurement error of the target color, and associate the color identification information with the determined first measurement error to record the associated first measurement error in the table.

Specifically, the calibration unit 640 may generate a depth image of the calibration pattern including the base color and the target colors. Next, the calibration unit 640 may identify the location of the base color and the locations of the target colors the in the calibration pattern. Also, the calibration unit 640 may calculate the location of the base color and the locations of the target colors in the depth image corresponding to the identified location of the base color and the identified locations of the target colors. Next, the calibration unit 640 may calculate a difference between the depth value of the calculated location of the base color and the depth value of the identified location of the target color.

The calibration unit 640 according to an example embodiment may be a component element generating or updating the table, and may be independent from the table storing unit 610, the target color identification unit 620, and the correction unit 630 in time-series manner.

Consequently, according to the present example embodiment, the apparatus of correcting the depth image may correct a depth distortion due to a color of the object, thereby generating a depth image corresponding to actual depth characteristics of the object. In addition, according to the present example embodiment, the apparatus may generate a depth image corresponding to the actual depth characteristics of the object although a degree of the distortion for each depth camera is different from each other.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to one or more embodiments. The media may also be a distributed network, so that the computer readable code is stored/transferred and executed in a distributed fashion. Still further, as only an example, the processing device could include a processor or a computer processor, and processing elements may be distributed and/or included in a single device.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method for correcting a depth image of an object, the method comprising:
   storing a table formed according to color identification information of a target color, and a first measurement error, the first measurement error being a difference between a ground truth depth value of a base color and a measured depth value of the target color;
   determining a region of the target color in the depth image; and
   correcting a depth value of the determined region based on the first measurement error.

2. The method of claim 1, further comprising:
   generating a depth image of a calibration pattern including the base color and the target color;
   identifying a location of the base color and a location of the target color in the calibration pattern;
   calculating the location of the base color and the location of the target color in the depth image of the calibration pattern corresponding to the identified location of the base color and the identified location of the target color;
   calculating a difference between a depth value of the calculated location of the base color and a depth value of the identified location of the target color;
   determining the calculated difference as the first measurement error; and
   associating the color identification information with the determined first measurement error to record the associated determined first measurement error in the table.

3. The method of claim 1, further comprising:
   calculating a second measurement error based on at least one of distance information, material information, temperature information, moisture information, brightness information, and saturation information of the object; and
   correcting the corrected depth value based on the calculated second measurement error.

4. The method of claim 1, wherein the determining of the region of the target color includes:
   generating a color image of the object using a color camera; and
   identifying a location of the target color in the generated color image, and determining the region of the target color in the depth image based on the identified location of the target color.

5. The method of claim 4, wherein the color camera is at least one of a complementary metal-oxide semiconductor (CMOS) camera and a charge-coupled device (CCD) camera.

6. The method of claim 1, wherein the determining of the region of the target color includes:
   generating a color image of the object using a color camera together with a depth camera generating the depth image;
   calculating a location of the target color in the generated color image;
   calculating conversion information between the depth camera and the color camera; and
   applying the calculated conversion information in the calculated location of the target color to determine the region of the target color in the depth image.

7. The method of claim 6, wherein the depth camera generates the depth image based on a Time Of Flight (TOF).

8. The method of claim 1, wherein the base color and the target color are captured at an identical distance from a depth camera generating the depth image.

9. The method of claim 1, wherein the base color is any one color of black, white, and gray.

10. At least one non-transitory medium comprising computer readable instructions causing at least one processing device to implement the method of claim 1.

11. An apparatus of correcting a depth image of an object, the apparatus comprising:
   a table storing unit to store a table formed according to color identification information of a target color, and a first measurement error, the first measurement error being a difference between a ground truth depth value of a base color and a measured depth value of the target color;
   a color identification unit to identify a region of the target color in the depth image; and
   a correction unit to correct a depth value of the identified region of the target color based on the first measurement error.

12. The apparatus of claim 11, further comprising:
   a calibration unit to generate a depth image of a calibration pattern including the base color and the target color, and to identify a location of the base color and a location of the target color in the calibration pattern.

13. The apparatus of claim 12, wherein the calibration unit calculates a location of the base color and a location of the target color in the depth image corresponding to the identified location of the base color and the identified location of the target color, and calculates a difference between a depth value of the calculated location of the base color and a depth value of the identified location of the target color, and
   the table storing unit determines the calculated difference as the first measurement error, and associates the color identification information with the determined first measurement error to record the associated determined first measurement error in the table.

14. The apparatus of claim 11, wherein the color identification unit identifies a location of the target color in a color image of the object generated using a color camera, and calculates the region displayed as the target color in the depth image based on the identified location of the target color.

15. The apparatus of claim 11, wherein the color identification unit identifies a location of the target color in a color image of the object generated using a color camera together with a depth camera generating the depth image, and calculates conversion information between the depth camera and the color camera.

16. The apparatus of claim 15, wherein the color identification unit applies the calculated conversion information in the calculated location of the target color to determine the region displayed as the target color in the depth image.

\* \* \* \* \*